Dec. 22, 1936.    O. T. HANDWERK    2,065,220
CONTROL APPARATUS
Original Filed Sept. 24, 1930    4 Sheets-Sheet 1

Inventor
Otto T. Handwerk
per James B. Lewis
Attorney

Dec. 22, 1936.   O. T. HANDWERK   2,065,220
CONTROL APPARATUS
Original Filed Sept. 24, 1930   4 Sheets-Sheet 2
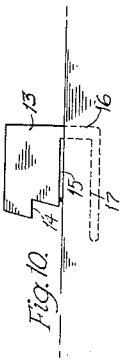
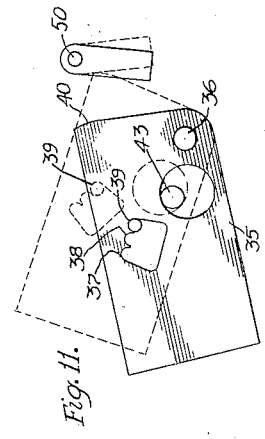
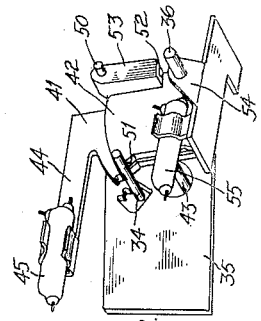
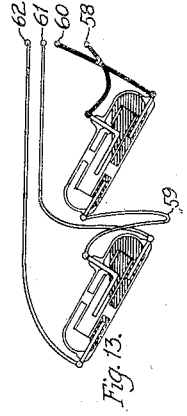
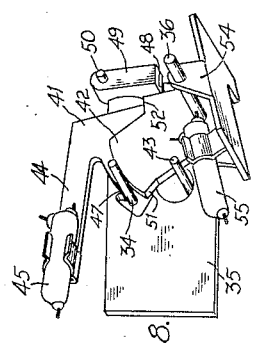
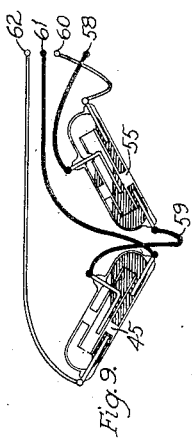
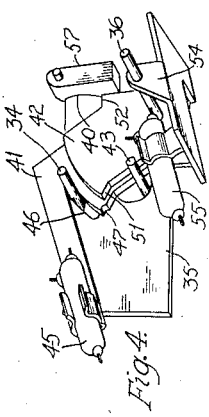
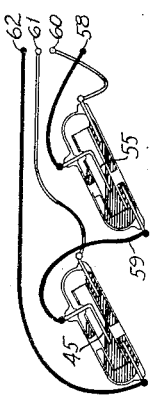
Inventor
Otto T. Handwerk
per James B. Lewis
Attorney Dec. 22, 1936.   O. T. HANDWERK   2,065,220
CONTROL APPARATUS
Original Filed Sept. 24, 1930    4 Sheets-Sheet 3
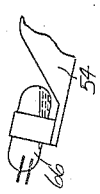
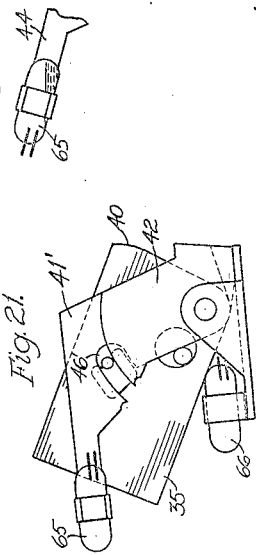
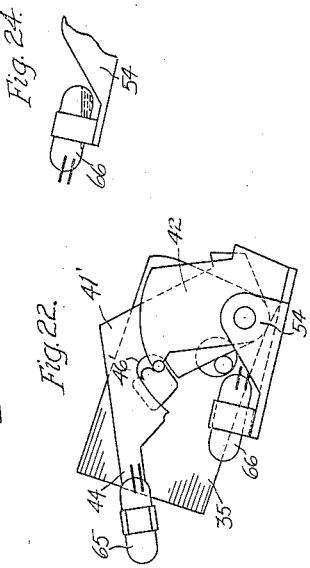
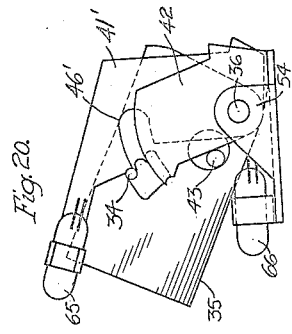
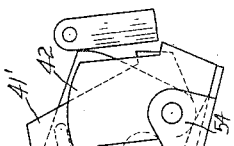
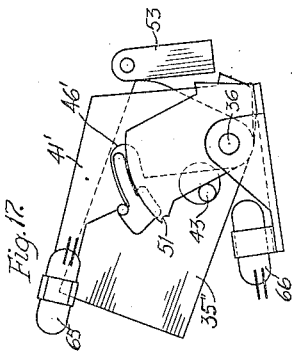
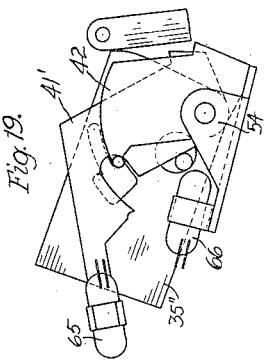
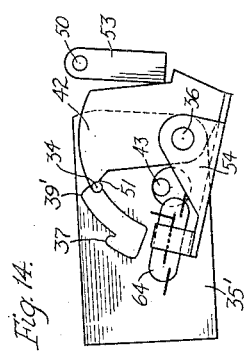
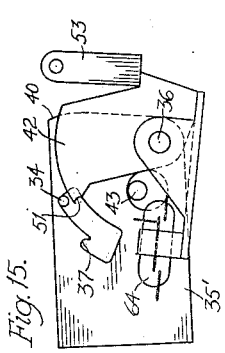
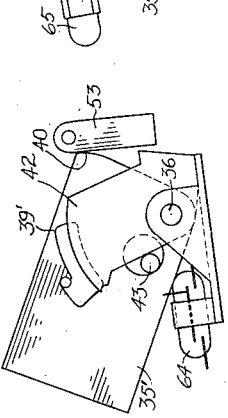
Inventor
Otto T. Handwerk
per James B. Lewis
Attorney Dec. 22, 1936.   O. T. HANDWERK   2,065,220
CONTROL APPARATUS
Original Filed Sept. 24, 1930   4 Sheets-Sheet 4

Inventor
Otto T. Handwerk.
per James B Lewis
Attorney

Patented Dec. 22, 1936

2,065,220

UNITED STATES PATENT OFFICE 2,065,220

CONTROL APPARATUS

Otto T. Handwerk, Chicago, Ill., assignor, by mesne assignments, to The Brown Instrument Company, Philadelphia, Pa., a corporation of Pennsylvania Continuation of applications Serial No. 484,059, September 24, 1930, and Serial No. 513,662, February 5, 1931. This application May 22, 1933, Serial No. 672,359

23 Claims. (Cl. 200—56)

This invention relates generally to automatic controllers and regulators or analogous contrivances.

More particularly the invention relates to those devices in which there is utilized a needle or pointer functionally related to the condition of an apparatus which is to be regulated or otherwise controlled.

In many installations the condition of the apparatus to be regulated or controlled is indicated by a delicate needle or pointer, which cannot be employed to operate heavy mechanism necessary for controlling the apparatus whose condition is shown without impairing its accuracy. In other words, the needle is delicately constructed so as to respond readily to its motivating force, which in most cases is very feeble, so that it is practically impossible for it to perform any control operation, even if it could be done without destroying its sensitivity.

Many control devices, in order to cope with this situation, utilize electric relays and the like energized by the closure of contacts, the relays in turn operating the control apparatus. The contacts of such devices are closed periodically either by depressing the pointer against the contact mechanism or by depressing the contact mechanism against the pointer. In either case the pointer is bent or flexed out of its normal plane of movement in performing the control operation, and as will be apparent, considerable pressure is exerted on the delicate pointer which is objectionable because of the strains put on the pointer and its supporting pivots. The difficulty with these devices is that operation is directly through the pointer or needle, which is necessarily very delicate and, therefore, should be freed of all unnecessary flexing.

One object of the present invention is to provide an improved regulator or controller whose operation may be accurately determined by the above-described pointers, which as has been pointed out are extremely delicate in construction and weak in operation, without impairing in any way the accuracy or sensitivity thereof. Other objects are to provide a control apparatus of this type which is driven by power, preferably mechanically, without any possibility that the driving means or motor will place any stress upon the index or otherwise affect the accuracy of the index, although the actual movement of the control apparatus is effected positively by power.

In one desirable arrangement the power driven control apparatus is controlled according to an oscillating feeler or tactor which beats across the path of the index, and which preferably has several surfaces determining different positions of the tactor according to various positions of the index. I prefer to arrange the control apparatus which is governed by the tactor or its equivalent to give a variable action upon a pivoted lever or a bank of such levers controlling mercury or other electric switches. In the arrangement illustrated in the drawings a power driven actuator operates the lever or levers, and its effective power is varied by a novel selector controlled by the engagement of the tactor with the index.

According to an important feature of the invention the levers are positively held in the positions to which they may be shifted by improved latch mechanism which is automatically released by the power-driven actuator when a different setting of one or more of the levers becomes necessary.

Another feature of the invention relates to the variable control of the main operation, such as the amount of current flowing in a heating circuit or the amount of fuel fed to a furnace, by the variable operation of a resistor or a series of switches or a fuel valve or the like according to the variable throw of a control lever which is actuated by the above-described power actuator and which is preferably controlled as to the extent of its throw by causing the actuator to engage the lever at different points in its length according to the setting of the selector. From this point of view an important feature of the invention relates to the provision of novel latch mechanism which will hold the lever positively in any of its several positions.

The above and other objects and features of the invention, including various novel combinations of parts and desirable particular constructions, will be apparent from the following description of the illustrative embodiments shown in the accompanying drawings, in which:

Figure 1 is a fragmentary perspective elevation more or less diagrammatic of a device which is the subject matter of this invention.

Figures 2 to 13 inclusive are diagrammatic representations of the tactor and associated mechanism showing the relative positions thereof during varying steps of operation of the device.

Figures 14, 15, and 16 illustrate a double pole switch adaptation and a succession of stages in the operation of this form of the device.

Figures 17, 18, and 19 illustrate two single pole switches and a succession of stages in the operation of this form of the device.

Figures 20, 21, and 22 illustrate a further modification of a two single pole switch arrangement and a succession of stages in the operation of the device.

Figures 23 and 24 illustrate the switch arms with the switches reversed in position to that shown in Figures 17 to 22 inclusive

Figure 1:
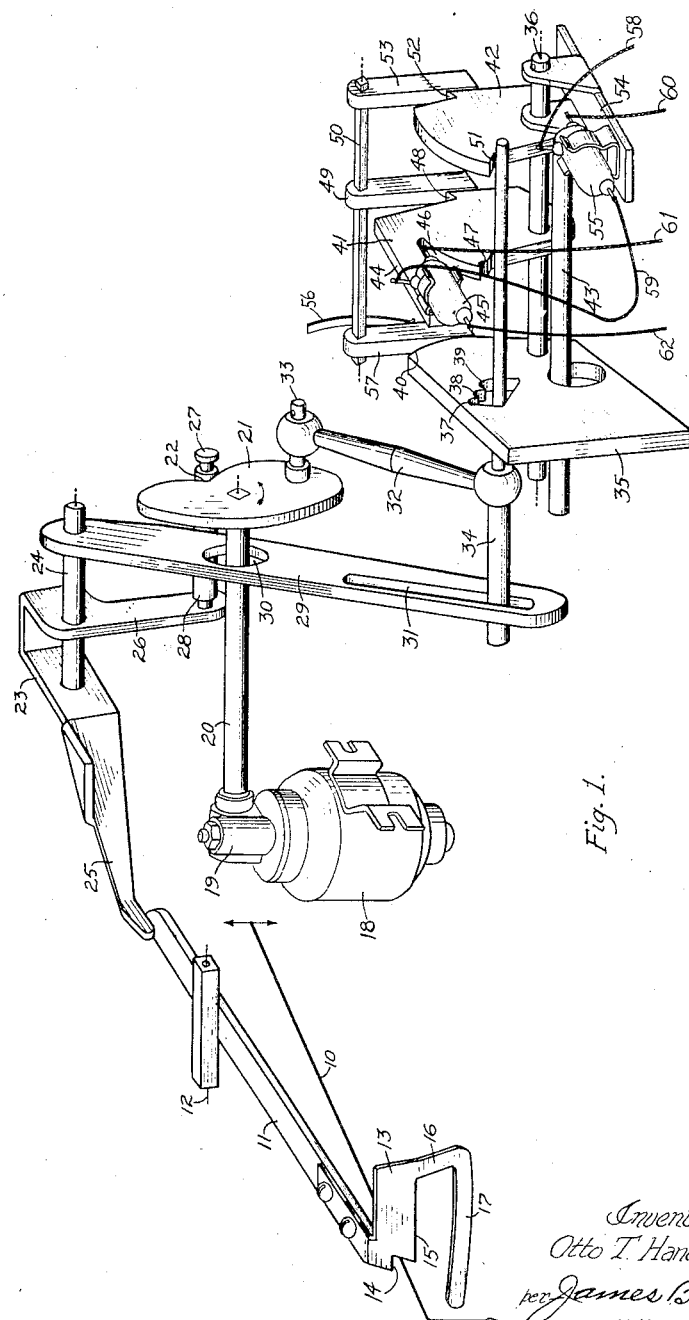

Referring to the exemplary embodiment of the invention illustrated in Figure 1, index 10 is the needle, pointer, or indicator, of any electrical, mechanical, chemical, or other instrument and is deflected to the right or left as viewed in Figure 1, in response to any change to be recorded or in response to any change which is to exercise any control or actuate any mechanism. Indeed, it may be the pointer of any instrument whatsoever.

A lever 11 pivoted, intermediate its ends, as at 12, is caused by a power means to vibrate up and down to cause an angularly disposed projection or pointer engaging portion 13 on its free end to beat across the path of the needle. The portion 13 is provided with steps 14 and 15, a guard 16 pendent therefrom and a laterally extending arm 17. The step portions 14 and 15 are intended to be intercepted by the needle 10 whereby the lever 11 is arrested and the desired regulation of the apparatus to which the needle is responsive is effected. It will be seen from the following description that a mere touch of the lever 11 upon the index is sufficient and for convenience the lever, or its needle engaging portion, is termed a tactor. The tactor may be made in a variety of forms and need not necessarily be oscillatory and it may be operated by any type of prime mover.

As shown the power device may take the form of a motor 18 which may be of the continuous or intermittant operating type which, through a series of reduction gears 19, drives the shaft 20 provided with a cam 21 or equivalent means having a suitable dwell or pause 22 therein. The rear end of lever 11 terminates substantially above the pivotal axis of pointer 10 and is suitably supported to swivel or turn about an axis coincident with the axis of the pointer. This arrangement permits of adjustment of the tactor to any point along the scale where it is desired that the control be effected.

The cam 21 is connected to the tactor 11 to oscillate the latter, through a bell crank 23 pivoted to turn about the shaft 24. The bell crank has a forwardly extending arm 25 adapted to co-act with the rear end of the lever 11 preferably above the axis of the pointer 10 and a depending arm 26 provided with a bearing pin 27 carrying a roller 28 riding upon the periphery of the cam 21.

The forward end of the tactor may be sufficiently heavy to maintain the roller 28 in engagement with the cam, unless otherwise prevented, although it is apparent that the weight of the lever may be augmented or replaced by a light spring if necessary. From the foregoing, it will be seen that rotation of the cam 21 causes the tactor to oscillate or reciprocate across the path of the pointer and that the extent of oscillation thereof is dependent upon the position of the pointer.

Rotation of the cam also causes the roller 28, as it rides into the dwell thereof, to position the selector 29 pivotally supported from the shaft 24. The selector may take the form of a bar provided with an enlarged opening 30, through which the shaft 20 extends, and an elongated slot 31 in its free end, the selector being biased toward the shaft 20 which acts as a stop to limit downward movement thereof.

An actuator 32 pivotally supported and actuated by pin 33 carried by the cam 21 carries a pin 34 one portion of which reciprocates in the slot 31 of the selector and the other portion of which co-acts with the guide 35 pivotally supported on shaft 36. The guide is provided with notches 37, 38, and 39, for retaining and guiding pin 34 and a cam portion 40, the function of which will be later described. The movement of the parts are synchronized so that the selector positions the actuator when it is at or near the bottom of its downward movement.

The actuator pin 34 is designed to actuate levers 41 and 42 to perform suitable control operations. Lever 41, pivotally supported from shaft 36, has an arm 44 for supporting a mercury switch 45, a re-entrant or cut away portion 46, through which the pin 34 moves under certain conditions of operation, a pin engaging detent 47 for retaining the pin 34 in position as it operates said lever and a latch engaging ledge 48 adapted, when the lever is raised, to engage a latch element 49, supported to turn with shaft 50, for retaining said lever in elevated position. The lever 42, also pivotally supported from shaft 36, has a pin engaging portion 51 for cooperation with the actuating pin 34, a latch engaging ledge 52 for engagement with a latch element 53, supported to turn with the shaft 50, for retaining said lever in raised position and a switch supporting arm or bracket 54 adapted to support a mercury switch 55. The guide 35 and levers 41 and 42 are biased to normally rest against a stop 43. In order that the parts function properly the portion 46, detent 47 and portion 51 are radially offset and the notches of the guide are correspondingly offset to cause the actuator to cooperate with the proper portion or detent.

Latch elements 49 and 53 are biased toward the levers 41 and 42 by a spring 56, and are operated by guide 35, the cam portion 40 of which co-operates with arm 57 carried by shaft 50.

The mercury switches 45 and 55 are of the double pole type and are connected by a short connector 59. The leads 58, 60, 61, and 62 may control respectively visible or audible signals, or relays, or switches, or valves for accomplishing suitable control operations.

In practice the index 10 is suitably connected to respond to variations in the condition to be controlled and the mercury switches are connected to circuits controlling suitable motors, switches, rheostats, or like devices and where desirable, the switches are connected in series with the resistors or like apparatus, the heating of which is to be regulated or controlled. As an example, the instant device is well adapted to the control of a system such as that disclosed in Wilhjelm Patent No. 1,739,882, dated December 17, 1929.

In applying the insistant device to the system shown in the patent the pyrometer there shown is removed and leads 58, 60, 61, and 62 are connected respectively to leads 36, 78, 71, and 74 of the patent and index 10 herein is connected to respond to the temperature of the furnace similarly to index 19 of the patent. With the device thus connected a more accurate and dependable control of the furnace is effected than with the type of control there shown.

Where desirable or necessary, heavy duty mercury switches may be employed, especially where high powers are being handled, in which case, the mercury switches may take the form shown in Figures 5 and 9 and 13, although single pole switches may be used instead of the double pole types illustrated. In the heavy duty type of switches, the circuit is made and broken in the mercury within the quartz tube, so that the heat of the arc is expanded on the quartz surface and is dissipated through the volume of mercury to prevent excessive heating of the lead in terminals where they pass through the glass tube and thereby prevent rupture of the tubes. Such switches are capable of handling high currents and may be connected in series with the resistors of a furnace to directly control the heating thereof, thus dispensing with relays and the like.

Switches such as those just described may be readily used with any or all of the forms of the device disclosed and it is to be understood that the type of switches shown in Figures 13 to 24, may be high and/or low duty switches and are shown for purpose of illustrating only.

In operation, assuming for purposes of illustration, that the device is controlling the heating of a furnace, shaft 20 rotates the cam 21 in the direction of the arrow thereon, and as the roller 28 rides into the dwell 22, the tactor 11 is lowered across the path of the pointer, as in Figure 2, and the selector is so positioned by roller 28 that the pin 34, on upward movement thereof, engages with notch 37 in the guide 35, as at Figure 3. Further rotation of the cam raises the tactor out of the path of the pointer and also causes the actuator pin, guided by guide 35, to travel through the reentrant portion 46 of the lever 41 to the position shown in Figure 4, and the levers remain in the normal position, with the circuit closed through leads 58, 59, 62, as indicated by the heavy lines in Figure 5. With the switches in this position the heat is turned on and the furnace will now begin to heat up. The described movements are repeated idly while the furnace is heating up and the needle 10 is consequently swinging from the normal, or zero, position toward the tactor.

Finally the advancing needle swings directly beneath the tactor 11; the step 14 engages the needle, as at Figure 6, and further downward movement of the tactor is arrested. Downward movement of the tactor being thus arrested, the roller 28 does not ride all the way into the dwell of the cam, consequently the selector 29 is so positioned by the roller that the actuating pin 34 cooperates with notch 38 of the guide 35, as at Figure 7, whereupon on upward movement of the actuator pin 34 engages detent 47 of lever 41 and elevates the lever to the position shown in Fig. 8, where the latch 49 engages the ledge 48 thereof and retains said lever in elevated position.

The mercury switch 45 then occupies the position shown in Figure 9, with the circuit closed through leads 58, 59, 61 and the temperature of the furnace has now reached the point at which it is to be maintained. As long as the temperature of the furnace remains at the desired point, the pointer remains in the position shown in Figure 6, and the actuator pin 34, guided by notch 38, reciprocates idly while the lever remains in elevated position.

If for any reason whatever the temperature of the furnace should increase beyond that desired, the needle will swing up scale and engage portion 15 of the tactor, as at Figure 10. When the downward movement of the tactor is thus arrested the roller 28 rides only slightly into the dwell of the cam, hence, the selector 29 positions actuating pin 34 to engage notch 39 in guide 35, as at Figure 11, whereupon on upward movement thereof said pin engages portion 51 of lever 42 and raises said lever to its elevated position shown in Figure 12, where the latch 53 engages the ledge 52 thereof and retains said lever in raised position. Lever 41 remains in elevated position while lever 42 is raised and both levers occupy the raised position illustrated in Figure 12. The mercury switches now occupy the position shown in Figure 13 and the circuit is closed through leads 58 and 60 and the heating of the furnace is diminished or shut off, since it is beyond the point desired and may cause irreparable damage by overheating.

As the furnace cools off, the pointer swings toward zero and soon moves in position to intercept step 14 of the tactor, as at Figure 6. As before described, when the pointer is intercepted by step 14, the selector positions the pen 34 in the notch 38 of the guide 35, and on upward movement thereof it engages the detent 47 of lever 41, as at Figure 8, upward movement of the guide causes the cam engaging portion 40 thereof to move the arm 57 outwardly, thereby pushing the latch element 53 free of the ledge 52 of the lever 42, and since the pin 34 does not engage portion 51 of this lever, as shown in Figure 8, it moves to its normal position.

This again changes the circuit to that shown in Figure 9, whereupon the heating of the furnace is controlled to bring the temperature to the point desired. It is to be noted that while the cam 40, through arm 57, operates the latch elements at each reciprocation the parts are so timed that the pin 34 engages the elevated lever prior to release of the latch and disengages said lever subsequent to engagement of the latch so that the lever remains in latched position, until there is a change in the condition being controlled which causes the pin 34 to travel another path wherein it does not engage the lever, which is then free to move to its lower position upon disengagement of the latch, Should the temperature of the furnace continue to decrease, the pointer will move to the positon shown in Figure 2, whereupon the tactor will make a complete oscillation and the parts will be operated to the position illustrated in Figures 3, 4, and 5, as previously described, whereupon a greater supply of heat will be supplied to the furnace, which will begin to heat up, and the cycle of operations will be repeated.

From the foregoing description it will be appreciated that the pointer, in moving from zero to maximum position, passes through several fields of action each of which fields defines a stage of control. Thus, when the pointer is in the field below the tactor, one control is effected, when in the field defined by step 14 of the tactor a different control is effected and when in the field spanned by step 15 of the tactor still another control operation is performed. Also the control operations, are effected when the pointer passes from one to the other of said fields.

The weight of the tactor is so arranged that it exerts very little pressure upon the index and the latter is adapted to be supported, during each depression, by the support 63 which may be the top of the scale plate of the instrument and the end of the tactor operates adjacent the support so that the index is better enabled to withstand the slight pressure exerted by the tactor. Guard 16 prevents accidental movement of the index past the tactor, and the arm 17, which normally lies below the top of the support 63, is momentarily raised slightly above the top of said support after each depression to free the index from said support thereby preventing sticking of the index.

The present invention is readily adaptable to different requirements and the following variations illustrate a few of the many possible arrangements. In the following examples certain of the original parts are slightly modified and such parts are designated by the original numbers for that part primed, thus in Figs. 14, 15, and 16, guide 35' is provided with notch 37 and a slot 39' and the double pole switch 64 is adapted to occupy one of two positions to perform suitable control operations. When the tactor is intercepted, as at Figure 10, the actuator pin is positioned, by the selector, to engage portion 51 of lever 42 to raise said lever to the latched position of Figure 14.

The condition of the controlled apparatus has exceeded that desired and the circuit thus closed, thru switch 65, effects a suitable control to bring the condition back to normal. When the index intercepts the tactor, as in Figure 6, the pin 34 reciprocates idly as at Figure 15, thus introducing a delay or time lag between operations of lever 42 since the index has to swing from the position of Figure 10 to position Figure 2, or in other words the intermediate position of Figure 6 does not effect a control operation, however, when the tactor makes a complete oscillation, as at Figure 2, the pin 34 engages notch 37 of the guide 35' elevates said guide to release the latch 53 thereby permitting the lever to move to the position, shown in Figure 16, closing the circuit thru switch 64 to turn on or increase the condition of the controlled apparatus. In this form of the device the control is either on or off, with no intermediate position, and the guide 35' operates only when the pin 34 engages the notch 37 and then to release the latch 53 from the ledge 52.

In the modification shown in Figure 17 the guide 35' has the usual notches 37 and 39 and an elongated slot 38' while the lever 41' has the reentrant portion 46' substending the notch 39 and slot 38' as clearly shown. The levers carry single pole switches which may control the regulation of a furnace, switch 66 being connected to control the heating of the furnace and switch 65 the operation of a signal indicating when the heat is on and when it is off. When the index makes a complete oscillation, as at Figure 2, the pin 34 is positioned to engage notch 37 to raise lever 41' to the position shown in Figure 17 where it is retained by the latch 49. With the switch thus positioned a suitable signal is operated to indicate that the heat controlled by switch 66 is on and that the furnace is heating up. As the index, responsive to the furnace temperature, swings to the position of Fig. 6 the actuator pin 34 is caused to travel the slot 38' of the guide and the cutout portion 46' of lever 41' without effecting either of said levers.

The condition of the apparatus continues to build up until the index intercepts the tactor, as at Figure 10, whereupon the actuator pin 34 engages notch 39 thereby raising the guide 33" to unlatch lever 41' which moves to the position of Figure 19 thereby changing the signal to indicate that the heat to the furnace has been cut off and at the same time elevating lever 42 to the latched position of Figure 19, thereby cutting off the heat to the furnace. As the furnace cools off the index swings back to the position of Figure 6, but as previously described, the actuator pin 34 travels the slot 38' and cutout portion 46' and nothing happens until the index, in its retrograde movement, reaches the position of Figure 2 where the actuator pin is operated to engage notch 37 to raise the guide 35" and lever 41' to the position of Figure 17 and delatch lever 42 which moves to the position of Figure 17. With the parts in this position the heat and signal are on and the furnace begins to heat up as previously described.

In many installations signals are required to indicate when an apparatus is functioning properly or to indicate to an operator when to effect a control of the apparatus. The present device is admirably suited for such work as illustrated in Fig. 20, which in many respects, is a duplication of the arrangement shown in Figure 17 excepting that the latch elements are removed, the guide 35 is the same as the guide of Figure 1, and the switch 66 is reversed in position to that shown in Figure 17. In this case the switches 65 and 66 are connected to control suitable signals, either visible or audible or both. When the actuator pin 34 engages the levers 41 and 42 said levers are raised and lowered with the pin, since there is no latch to maintain them in elevated position, and the signals are intermittently actuated.

The switch 65 may operate a signal or signals indicating that the apparatus is functioning properly or when used with a furnace that the furnace is heating up, while switch 66 may operate a signal or signals indicating that the condition of the apparatus is above normal, or in case of a furnace that the temperature is above that desired. During the interim the pointer is passing through the position of Figure 6 neither of the signals are operated, the pin 34 reciprocating idly thru portion 46', thus indicating that the condition of the apparatus is at the proper point or that the temperature of the furnace is at the desired point.

Under certain conditions it may be desirable to reverse the position of the switches 65 and 66 to have them close when the levers are in lowered or normal position and such an arrangement is shown in Figures 23 and 24.

From the foregoing it will be seen that the tactor intercepts the index only within narrow limits, that the index is free substantially all of the time to respond to its motivating force, and that the index is not required to put forth any effort toward operating the regulator.

In the arrangements illustrated in Figures 25 to 29, as in the ones described above, the casing usually used with instruments of this type is omitted, the index 110 which is shown in these figures being the pointer of any suitable instrument which may be functionally related to the value or condition to be controlled. This index 110 is adapted to cooperate with a scale 111 calibrated in suitable units and this scale is usually visible thru a window in the casing so that the instantaneous values of the condition may be observed and the needle is adapted to travel in proximity to the top of the scale plate, but out of contact therewith, so that it may respond readily to its motivating force.

The lever 112 is caused, by a prime moving device, to vibrate up and down to cause an angularly arranged portion 113 on its free end to dip into and out of the path of the index 110 and is adapted to cooperate with said needle at the proper time to effect the desired control. The portion 113 is intended to be intercepted by the index whereby the lever 112 is arrested and the desired control effected. It will be understood from the following description that a mere touch of the lever 112 upon the index is sufficient and for convenience, the lever or its tooth is termed a "tactor".

The lever 112 is pivoted intermediate its ends, as at 114, to a yoke 115 swivally connected to the casing to turn about an axis preferably coincident with the axis of the index 110 to permit of adjustment of the position of the tactor, relative to the scale, so that the control may be conveniently set to operate from any predetermined point on the scale.

Power for driving the regulating apparatus may be derived from a motor 116, which is preferably, although not necessarily, operating at a uniform speed. A constant speed motor is satisfactory for the purpose. This motor, thru suitable reduction gearing 117, drives the shaft 118 provided with a cam 119 or equivalent means having a suitable dwell or pause 120 therein. This cam is arranged to oscillate the tactor 113 thru a bell crank 121 pivoted, as at 122, and provided with a forwardly extending arm 123 and a depending arm 124. The arm 123 is adapted to coact with the rear end of the lever 112, preferably above the axis of the pointer 110, so that, when the lever is adjusted to different positions, the coaction between the arm and the lever will remain undisturbed and the depending arm 124 has a pin 125 for supporting the roller 126 in position to ride upon the periphery of the cam 119.

From the foregoing, it will be seen that rotation of the cam 119 causes the tactor to oscillate or vibrate across the path of the index and that the extent of oscillation thereof is dependent upon the position of the index. The forward portion of the tactor may be sufficiently heavy to maintain the roller 126 in engagement with the cam, although it is apparent that the weight of the lever may be augmented or replaced by a light spring. The extent of oscillation of the tactor determines the nature of the control to be affected and this control is made thru a selector 127 pivotally supported as at 128, which may take the form of a bar provided with an enlarged opening 129, thru which the shaft 118 extends, and an elongated slot 130 in its free end. The selector is biased toward the pin 125 carried by the depending arm of the bell crank and it will be seen that the extent of oscillation of the tactor determines the position of the selector.

An actuator 131, pivotally supported and actuated by a pin 132 carried by the cam 119, is provided with a cross arm 133, one portion of which reciprocates in the slot 130 of the selector and the other portion of which coacts with the guide 134 and a control lever 135 secured to the shaft 136. The shaft 136 is provided with a control member 137, the purpose of which will be later described.

The guide 134 pivotally supported, as at 138, on an axis preferably, although not necessarily, coincident with the shaft 136 is operated by the actuator 131, and during its upward motion actuates the latch mechanism comprising the arm 139 secured to the latch shaft 140 carrying the latch 141 which engages a series of teeth 142 on the control lever 135 to maintain said lever in position during the reciprocation of the actuator. The latch mechanism is preferably biased towards the lever 135 by means of a spring 143.

The index engaging portion 113 of the tactor is provided with a series of steps as indicated by the letters B, C, D, and E, and with a depending guard 144, which prevents accidental movement of the index beyond the tactor when the latter is in raised position. As will be evident, the particular step engaged by the index will depend upon the extent of deflection of said index and it will also be apparent that engagement of the different steps with the index causes different movements of the tactor.

Guide 134 is provided with a series of notches or indentations, A, B, C, D, and E with which the actuator arm 133 is adapted to engage for guiding the arm during its actuation upon rotation of the cam 119 and the control lever 135 is likewise provided with a series of steps A, B, C, D, and E, which are adapted to be engaged by the arm 133. Correspondingly lettered notches and steps are engaged by the actuator arm during a particular reciprocation.

The control lever 135 is preferably biased against the stop 145 by suitable means, such, for example, as the spring 146 connected to the control member 137 as illustrated in Figure 3 and the movement of the control member 137 may be transmitted to the element to be controlled by suitable transmission means such as the link 147. However, it is to be understood that the control member and means are illustrative only and that any means, suitable for the purpose, may be employed.

The method of operation of the device thus far described is as follows: Assuming that the tactor has been adjusted to that point on the scale representing the value where the condition is to be maintained constant, with the step C of the tactor coincident with this point; that the index is at the zero position; and that the device has been initially set in operation. As the cam 119 rotates in the direction of the arrow, and the roller 126 rides into the dwell 120, the bell crank and its associated mechanism causes the tactor to beat across the plane of movement of the index and the selector 127 to move to its forward position to thereby selectively position the actuator 131 which is then in its lowermost position. Further rotation of the cam raises the tactor out of the plane of the index and causes the actuator in its upward movement to successively engage the notch A of the guide and the step A of the control lever 135 to raise the control lever, which is retained in raised position by the latch 141. As the cam continues to rotate the actuator moves downwardly and the guide 134 moves with it until its movement is arrested by the stop 145, while the actuator continues its downward movement to complete the cycle of operation.

Since the index is down scale from the path of the tactor the selector is again positioned in its forward position and the actuator is so positioned that on upward movement it reengages the notch A and reciprocates the guide as before. As the actuator approaches its upper limit of movement, the guide 134 cams the latch arm 139 outwardly momentarily releasing the latch 141 from the teeth 142 of the control lever 135, but as the actuator is in the upper limits of its movement, the control arm 135 is prevented from dropping since the step A thereof engages the actuator 133 and immediately after the actuator begins its downward motion the guide 134 permits re-engagement of the latch 141 with the teeth 142 to maintain the control lever in its raised position. Movement of the control lever 135 to its new position, by the actuator, causes the control member 137 to affect a control of the condition to greatly increase the value thereof.

This increase of the condition causes the index 110 to deflect upscale and assuming that the index has now reached that point on the scale where the step C of the tactor, in its downward movement, engages the index 110. This arrest of the downward movement of the tactor causes the roller 126 to only partially ride into the dwell 120 of the cam, consequently the pin 125 positions the selector and actuator in a new position, such that the actuator arm 133 on upward movement successively engages the notch C of the guide and the step C of the control lever 135 to move the control member to a new position where it is retained by the latch 141 as previously described. As long as the index remains in position to intercept the notch C of the tactor the selector will position the actuator to engage the notch C of the guide and since the control member 135 is retained in its raised position, the value of the condition will be maintained at the predetermined point desired.

Assuming now that the value of the condition has decreased below the predetermined point to which it is to be maintained and that the index in response to this change has receded to such position that the tactor, in its downward movement, intercepts the index on the step B thereof. The movement of the tactor being thus arrested, by engagement of the step B with the index, the roller 126 rides slightly further into the dwell 120 than on its prior movements and so positions the selector that the actuator engages the notch B of the guide. As the actuator approaches the upper limits of its movement the guide 134, thru the arm 139, releases the latch 141 permitting the control lever 135 to drop until the step B engages the arm 133. This positions the control member in a new position where, as the guide moves away from the arm 139, the latch re-engages the ratchet 142 maintaining the control member in its then position.

The control member 137 now affects a control of the condition such that the value thereof is increased and as the index 110 deflects upscale in response to this increase in value it again moves into position to intercept the step C of the tactor whereupon the selector is positioned such that the actuator arm 133 successively engages the notch C of the guide and the step C of the control member to again move the control member to its normal position whereupon the condition is again restored to its normal value.

While a certain arrangement of parts and particularly the series of steps on the tactor, guide and control arm have been described in detail, it is to be understood that the stepped portions may be varied to suit the conditions of installation and the type of control desired, that the number of such steps may be either increased or decreased according to the particular requirements, and that the steps on the control arm may be sloped in a direction opposite to that shown or be replaced by an inclined portion having varying degrees of inclination.

From the foregoing description, it will be apparent that the index 110 in each instance determines the extent of movement of the tactor and thru its associated mechanism selects the path of movement of the actuator and thereby determines the effectiveness of the actuator upon the control member. While the actuator has a substantially uniform stroke the effectiveness of this stroke on the control arm or member is determined by the tactor which, through the selector, positions the actuator at varying radial distances from the pivotal center of the control member thereby varying the moment arm thru which it acts on said member. The points where the actuator engages the control member, while placed at different radial distances from the pivotal center of the member, are also inclined or sloped, so that the effective movement of the actuator on the control member is varied in accordance with its position at the time of engagement with the control member.

Figures 25, 26, 27, 28, 29:
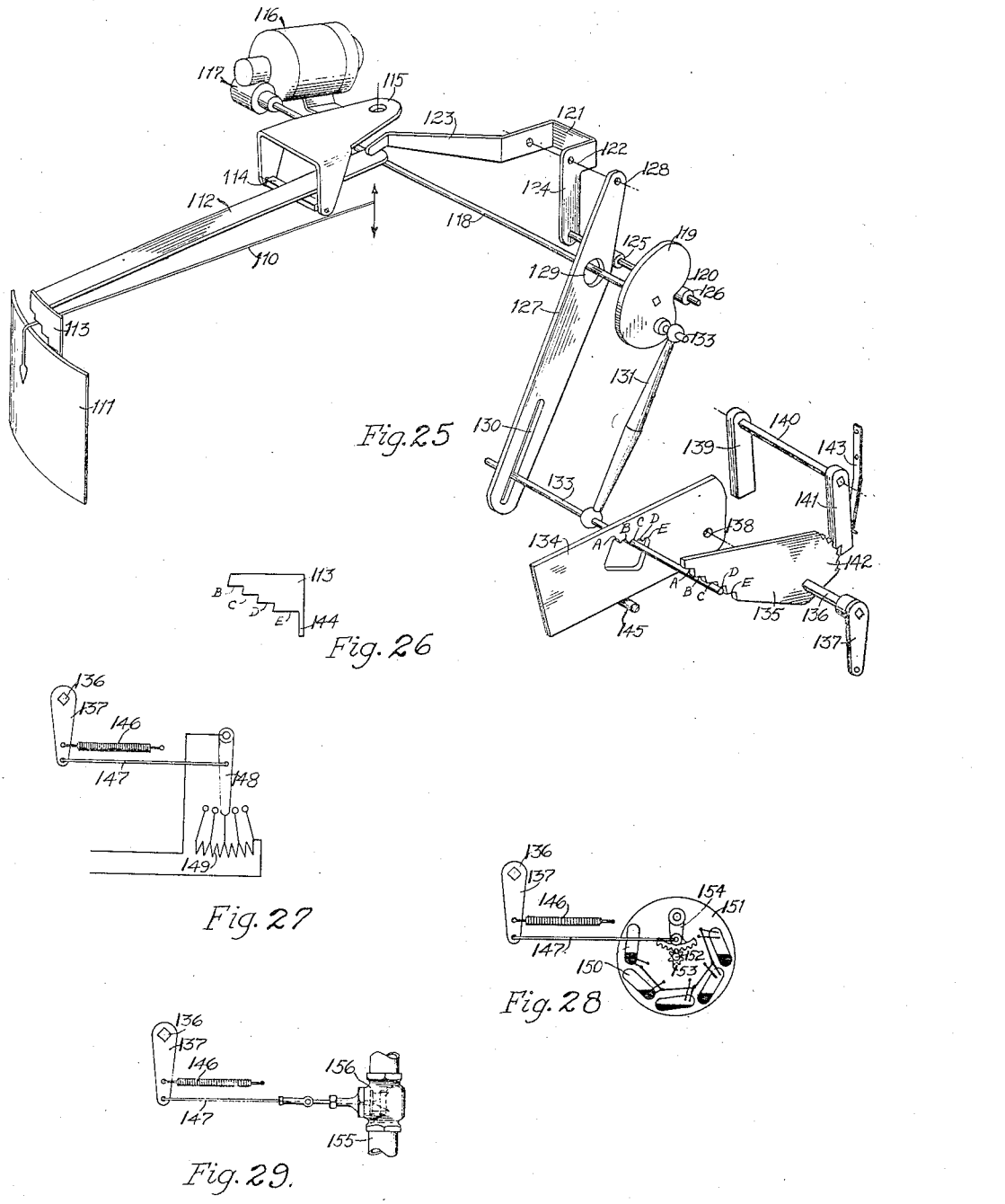
Figure 25 is a fragmentary diagrammatic perspective view of a modified form of the device in which a single control lever is given a variable throw to give the desired control.
Figure 26 is a front elevation of the needle-engaging portion of the tactor of the embodiment of Figure 25.
Figure 27 is a diagram showing the modification of Figure 25 adapted to the control of the resistance of an electric circuit, which may for example be utilized to control the speed of a motor or other apparatus.
Figure 28 is a diagram illustrating the adaptation of the modification of Figure 25 to the control of a plurality of mercury switches which may for example be utilized to control the energization of the resistors of an electric furnace, signalling device, or other apparatus.
Figure 29 is a diagram illustrating the adaptation of the modification of Figure 25 to the control of the flow of fuel or other fluid through a conduit.

The present invention is readily adaptable to different requirements and Figure 27 illustrates an application of the control to an electric circuit and wherein the link 147 is connected to the arm 148 of a rheostat 149 of an electric circuit which, for example, may include a motor, the speed of which is to be regulated. In this case, the index 110 is arranged to respond to a function of the speed of the motor and with the motor designed to operate at normal speed with the contact arm 148 in the position illustrated, it is evident that variations from this constant speed will cause variations in the position of the index and that the rheostat will be accordingly adjusted by the control apparatus to maintain the speed of the motor or other apparatus constant.

In Figure 28 the control member 137 is adapted to control the position of a series of mercury switches 150 which may be of the heavy duty type and connected in series with the resistors of an electric furnace to regulate the heating of such furnace. As illustrated, the mercury switches 150 are mounted upon a disc 151 pivoted to turn about a shaft 152 provided with a gear 153 meshing with a segment 154 connected to the link 147. In this type of control, the mercury switches are adapted to be selectively positioned so as to either increase or decrease the heating effect of the furnace in accordance with the movement of the index as it responds to the temperature of the furnace. Manifestly, the switches may also be connected to control signals, either audible or visible, instead of the heating of the resistors.

In Figure 29 the device is adapted to control the flow of the fluid thru a pipe 155 by operation of the valve 156, the stem of which is connected to the link 147. In the control of the flow thru the pipe, which may be maintained constant or otherwise, the index 110 responds to the flow of the fluid and the degree of regulation will depend upon the extent of deflection of the index in response to variations in such flow.

The term "index" must be considered, wherever used herein, as a broad comprehensive term intended to include any elements which may be moved by a slight force and that the term "control member" or "member to be controlled" must be considered as including means which is to be moved or regulated in accordance with the deflection of the index.

From the foregoing it will be seen that the invention contemplates an efficient, rugged and powerful control apparatus in which the control operations are affected from a sensitive index without exerting any great stress on the index or interfering with the sensitivity thereof, that the control may be set to maintain a predetermined valve and that variations from this valve are rectified with remarkable rapidity and accuracy.

It is to be understood that the invention is not limited by the exact embodiments of the device shown, which are merely by way of illustration and not limitation, as various and other forms of the device will, of course, be apparent to those skilled in the art without departure from the spirit of the invention or the scope of the claims.

The present application is a continuation of my prior applications Nos. 484,059 and 513,662.

I claim:

1. The combination with control means having a variable movement depending upon changes in the condition to be controlled, and a final power-operated controlling member variably controlled by said first means and given thereby movement into positions corresponding to the position of the first means.

2. The combination with means to be controlled of a pivoted element oscillatably mounted and having means to variably limit the oscillatory movement of the element in accordance with a condition to be controlled by said means, control means for controlling said condition and means controlled by said element for positioning the control means selectively in any one of three or more predetermined positions in accordance with the extent of oscillation of the pivoted element and holding it there until the next oscillation of the pivoted element.

3. The combination with a control member adapted to be moved into one of a plurality of positions according to a condition to be controlled, an actuator having a substantially constant actuating movement for operating the control member, means controlled according to said condition for varying the effective action of the actuator on the control member, a latch for holding the control member in the position to which it is shifted by the actuator, and latch-releasing means operated by the actuator.

4. The combination with a member having a variable degree of movement and adapted to be controlled in accordance with a condition to be controlled, actuating means for operating said control member and controlled according to said conditions to variably actuate said member to move it different amounts, and means for automatically holding said member in any position to which it is moved by the actuating means.

5. The combination with a movable index and a pivoted operating lever member to be controlled by extent of deflection of the index, of a tactor beating across the path of the index and having a variable beating movement dependent upon the position of the index, a reciprocable actuator for variably operating said member and a guide for said actuator controlled in its position by extent of beating movement of the tactor for determining the point of engagement of the actuator on the operating member in a manner automatically varying the effective lever arm of said member according to said deflection.

6. The combination with an index deflectable in a plane and a control member capable of occupying one of a plurality of three or more positions, of a tactor oscillatable across the plane of the index, the extent of oscillation being dependent upon the position of the index, an actuator for operating said control member and having a predetermined movement, and means controlled by the tactor for causing the actuator to operate the control member to a predetermined one of said plurality of positions dependent upon the extent of oscillatory movement of the tactor.

7. A control instrument comprising in combination an index deflectable in a plane, a tactor having an index engaging portion, means for causing said tactor to dip across the plane of the index and to be variably limited in its dipping movement by contact with the index in certain positions thereof, a pivoted control member, an actuator to engage said member at different points in its length and means controlled by said tactor for causing said actuator to operate said member to different positions according to the extent of deflection of the index.

8. A control device comprising in combination, a movable index, a tactor beating across the path of the index and variably limited thereby in certain positions thereof, a reciprocable actuator having a constant stroke, means for actutating said tactor and actuator, a pivoted member to be controlled in accordance with the position of said index, and a selector, positioned by said tactor, for selectively positioning the actuator for determining the point along the length of said member engaged by the actuator for changing the effective length of the member in accordance with the beating movement of the tactor.

9. In a control device, an index deflectable in a plane, a tactor beating across said plane and having a serrated index engaging portion for selectively limiting the movement of the tactor according to the deflection of the index, a reciprocable actuator having a predetermined reciprocation, a pivoted control member actuated by said actuator, and a selector selectively positioned by said tactor according to extent of movement thereof for causing said actuator to selectively coact with said control member for varying the length of the lever arm with which the actuator acts on said member.

10. In a control instrument, a movable index, a tactor having a graduated portion dipping across the path of the index and adapted to coact therewith in certain positions thereof for selectively limiting the dipping movement thereof, an actuator having a reciprocatory movement, a guide for selectively guiding the movement of the actuator, a control member operable to different positions, retaining means for holding said member in any one of a plurality of selected positions and actuable by said guide to release said member to take up a new position, and a selector positioned by said tactor for selectively positioning the actuator, relative to the guide, for causing movement of the control member according to deflection of the index.

11. In a control apparatus, a movable index deflectable in a plane, a tactor including a stepped portion dipping across the plane of the index for selectively limiting the movement of the tactor according to the extent of deflection of the index, a guide having a series of detents, a control member movable to one of a plurality of positions and having a stepped portion, the steps of which are coincident with the detents of the guide, an actuator arm for actuating the control member, a selector controlled by said tactor for selectively positioning said actuator to cause the same to engage a particular detent of the guide and be guided thereby to coact with a step of the control member to operate the control member to a predetermined one of said plurality of positions according to the extent of deflection of the index, and actuating means for causing the tactor to dip across the plane of the index and for operating the actuator and the control member.

12. Control-actuating mechanism comprising a reciprocable actuator having a transversely-extending member at its end, a selector for shifting said member and the actuator, and a lever engaged at different points along its length by said member when it is shifted by the selector.

13. Control-actuating mechanism comprising a reciprocable actuator having a transversely-extending member at its end, a selector for shifting said member and the actuator, and a control device variably engaged along its length by said member when it is shifted by the selector and which is shifted to corresponding different positions by said member.

14. Control-actuating mechanism comprising an actuator, a control device variably engaged by said actuator and moved to different positions thereby, latch means for holding said member in any position to which it is moved, and means operated by the actuator for releasing the latch.

15. Control-actuating mechanism comprising an actuator, a control device variably engaged by said actuator and moved to different positions thereby, and latch means for holding said member in any position to which it is moved.

16. Control-actuating mechanism comprising an actuator having a shiftable operating member, a selector for setting said member, a control member variably engaged by said operating member, latch means for holding the control member, and a device holding the operating member in selected position and which device is operated by the actuator to release the latch means.

17. Control-actuating mechanism comprising an actuator having a shiftable operating member, a selector for setting said member, a control member variably engaged by said operating member, latch means for holding the control member, and a device holding the operating member in selected position and which device is moved by said operating member to release the latch means.

18. Control mechanism comprising a member having step by step angular movement, a series of switches successively closed during successive steps of said movement, and automatic means for shifting said member from step to step of said movement.

19. Control mechanism comprising an index, a rotatable member having a series of mercury switches mounted at different angles thereon and successively closed by rotation thereof, and means controlled by said index for rotating said member to different ones of a plurality of a predetermined position.

20. A control instrument comprising an indicator element having associated therewith a tactor provided with steps and intercepted by said element in different positions according to the step engaged, and control mechanism set in corresponding different positions and comprising a pivoted member and an element set by said tactor for engagement with the pivoted member at different points in its length according to the step engaged by the indicator element.

21. The combination with control means having a variable movement depending upon changes in the condition to be controlled, an angularly adjustable final power-operated controlling member variably controlled by said first means and given thereby angular movement into angular positions corresponding to the position of the first mentioned means, and a plurality of mercury switches mounted on said member and angularly displaced with respect thereto, whereby said switches will open and close in predetermined order as said member is angularly moved back and forth through its said position.

22. Control actuating mechanism comprising in combination, a member angularly adjustable about an axis, a reciprocating actuator including a part adjustable relative to said axis to engage portions of said member at different distances from said axis and adapted on a reciprocatory movement of said actuator to adjust said member into an angular position dependent on the portion of said member then engaged by said part, a selector for determining the portion of said member engaged by said part, and control means selectively controlled by the positions into which said member is adjusted.

23. Control actuating mechanism comprising in combination, a member angularly adjustable about an axis, and formed with recessed seats at different distances from said axis, a reciprocating actuator including a part adjustable relative to said axis to engage one or another of said seats and adapted on a reciprocatory movement of said actuator to adjust said member into an angular position dependent on the seat then engaged by said part, a selector for determining the seat of said member engaged by said part, and control means selectively controlled by the positions into which said member is adjusted.

OTTO T. HANDWERK.